United States Patent
Delaney et al.

(10) Patent No.: US 7,760,708 B2
(45) Date of Patent: *Jul. 20, 2010

(54) METHODS, SYSTEMS, AND COMPUTER PROGRAM PRODUCTS FOR TRIGGERING SIP NODES TO INCLUDE SS7 ROUTING INFORMATION IN RESPONSE MESSAGES INCLUDING INFORMATION REQUESTED BY SS7 NODES

(75) Inventors: Robert J. Delaney, Raleigh, NC (US); Todd Eichler, Wake Forest, NC (US); Mahesh Tomar, Morrisville, NC (US)

(73) Assignee: Tekelec, Morrisville, NC (US)

( * ) Notice: Subject to any disclaimer, the term of this patent is extended or adjusted under 35 U.S.C. 154(b) by 1229 days.

This patent is subject to a terminal disclaimer.

(21) Appl. No.: 11/193,240

(22) Filed: Jul. 29, 2005
(Under 37 CFR 1.47)

(65) Prior Publication Data
US 2007/0008955 A1    Jan. 11, 2007

Related U.S. Application Data

(60) Provisional application No. 60/697,438, filed on Jul. 8, 2005.

(51) Int. Cl.
*H04L 12/66* (2006.01)
(52) U.S. Cl. ............. 370/352; 379/221.08; 379/221.13; 379/229; 379/230
(58) Field of Classification Search .................. 370/352; 379/221.08, 221.13, 229, 230
See application file for complete search history.

(56) References Cited

U.S. PATENT DOCUMENTS

| 4,191,860 A | 3/1980 | Weber |
|---|---|---|
| 5,008,929 A | 4/1991 | Olsen et al. |
| 5,602,909 A | 2/1997 | Carkner et al. |
| 5,650,998 A | 7/1997 | Angenot et al. |
| 5,671,225 A | 9/1997 | Hooper et al. |
| 5,712,908 A | 1/1998 | Brinkman et al. |
| 5,812,639 A | 9/1998 | Bartholomew et al. |
| 5,838,683 A | 11/1998 | Corley et al. |

(Continued)

FOREIGN PATENT DOCUMENTS

KR    1020030025024 A    3/2003

(Continued)

OTHER PUBLICATIONS

Gurbani et al., "The SPIRITS (Services in PSTN Requesting Internet Services) Protocol," Network Working Group, pp. 1-50 (Oct. 2004).

(Continued)

*Primary Examiner*—Quynh H Nguyen
(74) *Attorney, Agent, or Firm*—Jenkins, Wilson, Taylor & Hunt, P.A.

(57) ABSTRACT

Methods, systems, and computer program products are disclosed for triggering SIP nodes to include SS7 routing information in response messages including information requested by SS7 nodes. A message having SS7 routing information is received from a remote SS7 node. A corresponding SIP message is generated that includes the SS7 routing information and a parameter for triggering the SIP node to include the routing information in a response message. The corresponding SIP message is forwarded to a remote SIP node.

21 Claims, 6 Drawing Sheets

U.S. PATENT DOCUMENTS

| | | | |
|---|---|---|---|
| 5,852,660 | A | 12/1998 | Lindquist et al. |
| 5,862,129 | A | 1/1999 | Bell et al. |
| 5,930,700 | A | 7/1999 | Pepper et al. |
| 5,983,217 | A | 11/1999 | Khosravi-Sichani et al. |
| 6,002,693 | A | 12/1999 | Hahn |
| 6,070,076 | A | 5/2000 | Valentine |
| 6,134,618 | A | 10/2000 | Hebert |
| 6,175,574 | B1 | 1/2001 | Lewis |
| 6,182,086 | B1 | 1/2001 | Lomet et al. |
| 6,205,214 | B1 | 3/2001 | Culli et al. |
| 6,249,572 | B1 | 6/2001 | Brockman et al. |
| 6,324,183 | B1 | 11/2001 | Miller et al. |
| 6,324,279 | B1 * | 11/2001 | Kalmanek et al. ........... 379/229 |
| 6,327,267 | B1 | 12/2001 | Valentine et al. |
| 6,327,270 | B1 | 12/2001 | Christie et al. |
| 6,330,324 | B1 | 12/2001 | Sabinson et al. |
| 6,363,431 | B1 | 3/2002 | Hammer et al. |
| 6,396,840 | B1 | 5/2002 | Rose et al. |
| 6,434,155 | B1 | 8/2002 | Jones et al. |
| 6,535,506 | B1 | 3/2003 | Narain et al. |
| 6,560,326 | B1 | 5/2003 | Clark |
| 6,606,379 | B2 | 8/2003 | Khadri et al. |
| 6,611,532 | B1 | 8/2003 | Madour et al. |
| 6,611,584 | B1 | 8/2003 | Khello et al. |
| 6,625,273 | B1 | 9/2003 | Ashdown et al. |
| 6,683,881 | B1 * | 1/2004 | Mijares et al. ............... 370/401 |
| 6,731,741 | B1 | 5/2004 | Fourcand et al. |
| 6,760,343 | B1 | 7/2004 | Krishnamurthy et al. |
| 6,779,030 | B1 | 8/2004 | Dugan et al. |
| 6,785,374 | B2 | 8/2004 | Wang et al. |
| 6,785,378 | B2 | 8/2004 | Mar |
| 6,795,546 | B2 | 9/2004 | Delaney et al. |
| 6,882,638 | B1 | 4/2005 | Garcia-Martin et al. |
| 6,914,973 | B2 | 7/2005 | Marsico |
| 6,944,666 | B2 | 9/2005 | Belkin |
| 6,959,076 | B2 | 10/2005 | Chang et al. |
| 7,580,517 | B2 | 8/2009 | Khadri et al. |
| 2001/0046285 | A1 | 11/2001 | Park |
| 2001/0053218 | A1 | 12/2001 | Leung et al. |
| 2002/0048360 | A1 | 4/2002 | Zambre et al. |
| 2002/0054674 | A1 | 5/2002 | Chang et al. |
| 2002/0059411 | A1 | 5/2002 | Barnhouse et al. |
| 2002/0196779 | A1 | 12/2002 | Khadri et al. |
| 2003/0037108 | A1 | 2/2003 | Peiffer et al. |
| 2003/0076815 | A1 | 4/2003 | Miller et al. |
| 2003/0231652 | A1 | 12/2003 | Sprague et al. |
| 2003/0235285 | A1 | 12/2003 | Marsico |
| 2004/0005045 | A1 | 1/2004 | Adams et al. |
| 2004/0024894 | A1 | 2/2004 | Osman et al. |
| 2004/0264671 | A1 | 12/2004 | Lamberton et al. |
| 2005/0094623 | A1 | 5/2005 | D'Eletto |
| 2005/0203994 | A1 | 9/2005 | Palmer et al. |
| 2006/0209791 | A1 | 9/2006 | Khadri et al. |
| 2007/0019633 | A1 | 1/2007 | Tomar et al. |
| 2007/0168421 | A1 | 7/2007 | Kalyanpur et al. |
| 2008/0175223 | A1 | 7/2008 | Croak et al. |
| 2008/0181382 | A1 | 7/2008 | Lean et al. |
| 2008/0260119 | A1 | 10/2008 | Marathe et al. |
| 2008/0285438 | A1 | 11/2008 | Marathe et al. |

FOREIGN PATENT DOCUMENTS

| | | |
|---|---|---|
| WO | WO 01/24499 A1 | 4/2001 |
| WO | WO 02/07456 A1 | 1/2002 |
| WO | WO 02/45439 A2 | 6/2002 |
| WO | WO 02/49315 A2 | 6/2002 |
| WO | WO 2007/002794 A2 | 1/2007 |

OTHER PUBLICATIONS

Sidebottom et al., "SS7 MTP3-User Adaptation Layer (M3UA)," Network Working Group, pp. 1-107 (Feb. 2002).

Anonymous, "SS7 Telephony Technical Specifications," Trillium Digital Systems, Inc., www.trillium.com/products/ss7-telephony/techical, p. 1 (2001).

Anonymous, "Message Transfer Part (MTP) Level 3," Trillium Digital Systems, Inc., www.trillium.com/tech/1078028.html, pp. 1-3 (2001), filed Jul. 29, 2005.

Interview Summary for U.S. Appl. No. 11/476,430 (Mar. 27, 2009).

Official Action for U.S. Appl. No. 11/476,430 (Dec. 18, 2008).

Notification of Transmittal of the International Search Report and the Written Opinion of the International Searching Authority, or the Declaration for corresponding International Patent Application No. PCT/US2006/025284 (Feb. 16, 2007).

Notification of Transmittal of the International Search Report and the Written Opinion of the International Searching Authority, or the Declaration for International Application No. PCT/US06/26555 (Feb. 16, 2007).

Notice of Allowance and Fee(s) Due for U.S. Appl. No. 11/476,430 (Feb. 5, 2010).

Interview Summary for U.S. Appl. No. 11/476,430 (Nov. 10, 2009).

Final Official Action for U.S. Appl. No. 11/085,620 (Jun. 19, 2009).

Interview Summary for U.S. Appl. No. 11/085,620 (Apr. 30, 2009).

Office Action for U.S. Appl. No. 11/085,620 (Dec. 19, 2008).

Notification of Transmittal of the International Search Report and the Written Opinion of the International Searching Authority, or the Declaration for International Application No. PCT/US06/10263 (Sep. 25, 2007).

Redmill, "An Introduction to SS7," Booktrout Technology, pp. 1-26 (Jul. 2001).

Conta et al., "Use of Label Switching on Frame Relay Networks Specification," Network Working Group, IETF RFC 3034 (Jan. 2001).

Liao et al., "SS7-TCAP/IP Interworking," Internet Engineering Task Force, pp. 1-14 (Mar. 1999).

Tekelec, "Eagle® Feature Guide," PN/9110-1225-01, (Jan. 1998).

Final Official Action for U.S. Appl. No. 11/476,430, Jul. 15, 2009.

* cited by examiner

METHODS, SYSTEMS, AND COMPUTER PROGRAM PRODUCTS FOR TRIGGERING SIP NODES TO INCLUDE SS7 ROUTING INFORMATION IN RESPONSE MESSAGES INCLUDING INFORMATION REQUESTED BY SS7 NODES

RELATED APPLICATIONS

This application claims the benefit of U.S. provisional patent application No. 60/697,438, filed Jul. 8, 2005, the disclosure of which is incorporated herein by reference in its entirety.

TECHNICAL FIELD

The subject matter described herein relates to routing signaling messages in networks that utilize different signaling protocols. More particularly, the subject matter described herein relates to methods, systems and computer program products for triggering SIP nodes to include SS7 routing information in response messages.

BACKGROUND

Telecommunication networks include two distinct communication pathways or sub-networks—a voice network and a signaling network. These two networks function in a cooperative manner to facilitate calls between users. As implied by its name, the voice network handles the transmission of voice (or user data) information between users. The signaling network has a number of responsibilities, which include call setup, call teardown, and database access features. In simple terms, the signaling network facilitates the dynamic linking together of a number of discrete voice-type communication circuits such that a voice-type connection is established between a calling and a called party. Additionally, the signaling network provides a framework through which non-voice-related information may be transported, with this data and transport functionality being transparent to the users. This signaling technique is often referred to as out-of-band signaling, where the term "band" implies voice band.

The signaling protocol commonly employed in communication networks around the world, such as public switched telephone networks (PSTN), is the signaling system 7 (SS7) protocol. From a hardware perspective, an SS7 network includes a plurality of SS7 nodes, generically referred to as signaling points (SPs), that are interconnected using signaling links, also referred to as SS7 links. At least three types of SPs are provided in an SS7 network: service switching points (SSPs), signal transfer points (STPs) and service control points (SCPs). Within an SS7 signaling network, each SP is assigned an SS7 network address, which is referred to as a point code (PC).

An SSP is normally installed in Class 4 tandem or Class 5 end offices. The SSP is capable of handling both in-band signaling and SS7 signaling. An SSP can be a customer switch, an end-office, an access tandem and/or a tandem. An STP transfers signaling messages from one signaling link to another. STPs are packet switches and are generally installed as mated pairs. Finally, SCPs control access to databases, such as 800 number translation databases, 800 number carrier identification databases, calling card verification databases, and other databases.

SS7 supports service models such as the intelligent network (IN), whereby some features are executed locally on SSPs, while other features are executed on SCPs. In many cases, IN services are extended by accessing a host or server in an Internet protocol (IP) network using an IP-compatible protocol, such as session initiation protocol (SIP).

A new protocol framework based on SIP called "services in the PSTN requesting Internet services" (SPIRITS) provides SS7 nodes the ability to use Internet hosts that provide PSTN services. SPIRITS is an Internet engineering task force (IETF) protocol described in Network Working Group RFC 3910, October 2004, the disclosure of which is incorporated by reference herein in its entirety. The SPIRITS protocol enables the execution of services in the Internet based on certain events occurring in an SS7 network. SS7 nodes make service requests that are then processed on Internet-hosted servers. In general terms, the Internet host is interested in getting notifications of certain events occurring in the SS7 network, such as call answered, called party busy, route select failure, call disconnect, and others. When an event of interest occurs, the SS7 node notifies the Internet host. The Internet host can then execute appropriate services based on these notifications. For example, the Internet host may use this information to facilitate intelligent network services such as call waiting ID, call forwarding, and the like, which utilize an IP network. To give a specific example, a subscriber can receive an indication on his or her computer screen at work that a call is being received at home. The indication may also provide options to the user for acting on the information, such as answer the call, transfer the call to voice mail, and forward the call to another number.

The SPIRITS protocol, and SIP in general, however, does not define a mechanism for maintaining originating SS7 point codes and/or originating network group codes (discussed further below) in messages forwarded from an SS7 network to an IP network node, such as a SIP node, and back. For example, there are cases when an SS7 node, such as an STP, may send a message to an SIP node requesting a response using SIP (e.g., SPIRITS). In such a case, the SS7 node is conventionally required to maintain state information for the message so that the originating SS7 routing information of the SS7 node to which the response should be sent is known once the response is received from the SIP node. Maintaining such state information at the STP is resource intensive. It would be beneficial to be able to receive the SS7 routing information from the SIP node in the response message to reduce the requirement of maintaining state information at the STP. Although there are provisions in SPIRITS for including called party phone numbers and calling party phone numbers in messages, there are currently no provisions for SS7 point codes or network group codes.

Group codes and their usage are described in commonly-assigned co-pending U.S. patent application Ser. No. 10/093,862, filed Mar. 8, 2002, entitled "Methods and Systems for Providing Duplicate Point Code Support in a Signaling Message Routing Node", the disclosure of which is incorporated by reference herein in its entirety. The above application relates to a communications network element that is capable of providing intra- and inter-network message routing functionality in a networking environment including multiple national signaling networks. More particularly, a routing node routes signaling messages between multiple national networks, where the same point code is used to identify different nodes in two or more of the networks. For example, an STP facilitates signaling communication within and between different national SS7 networks with signaling points that share point codes. In order to achieve this duplicate point code routing functionality, in one example, a group code may be assigned to a received message based on a linkset and adjacent point code from which the message was received.

Once the group code is assigned, it may be used to internally route the message to the output port associated with the appropriate destination group, which may be a national network.

Group codes are used to represent SS7 networks because telecommunications networks in different countries may use the same point codes. That is, although a given SS7 point code must be unique within a given country's signaling network, there is no prohibition on using the same point code in another country's signaling network. This duplicate point code usage problem is particularly prevalent in the European telecommunications markets and makes it difficult for an international network operator to implement a signaling gateway (SG) or STP to simultaneously serve multiple national networks. Group codes enable an STP or SG to simultaneously serve multiple national networks in which point codes are re-used.

As stated above, the SIP and the SPIRITs protocols are increasingly being used to provide advanced telecommunications services. However, neither protocol currently provides a mechanism for triggering SIP nodes to include SS7 routing information in response messages.

Accordingly, there exists a need for methods, systems, and computer program products for including SS7 routing information in a SIP message.

SUMMARY

In one aspect of the subject matter disclosed herein, a method is disclosed for triggering SIP nodes to include SS7 routing information in response messages including information requested by SS7 nodes. A first message having SS7 routing information is received from a remote SS7 node. A corresponding SIP message is generated that includes the SS7 routing information and a parameter for triggering the SIP node to include the routing information in a response message. The corresponding SIP message is forwarded to a remote SIP node.

In another aspect of the subject matter disclosed herein, a system is disclosed for triggering SIP nodes to include SS7 routing information in response messages including information requested by SS7 nodes. The system includes an SS7 network interface that receives, from a remote SS7 node, a first message having SS7 routing information. A message processor generates a corresponding SIP message that includes the SS7 routing information and a parameter for triggering the SIP node to include the routing information in a response message. An IP network interface forwards the corresponding SIP message to a remote SIP node.

In another aspect of the subject matter disclosed herein, a computer program product is disclosed. The computer program product includes computer executable instructions embodied in a computer-readable medium. The computer-executable instructions are for performing steps at a SIP-enabled network node including receiving a first message having SS7 routing information from a remote SS7 node, generating a corresponding SIP message that includes the SS7 routing information and a parameter for triggering the SIP node to include the routing information in a response message, and forwarding the corresponding SIP message to a remote SIP node.

As described in the preceding paragraph, the subject matter described herein may be implemented using a computer program product comprising computer-executable instructions embodied in a computer readable medium. Exemplary computer readable media suitable for implementing the subject matter described herein include disk memory devices, chip memory devices, application specific integrated circuits, programmable logic devices, or any other medium capable of storing computer executable instructions or logical implementations thereof. In addition, a computer program product that implements the subject matter described herein may be distributed across multiple devices and/or computing platforms.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

Figure 1:
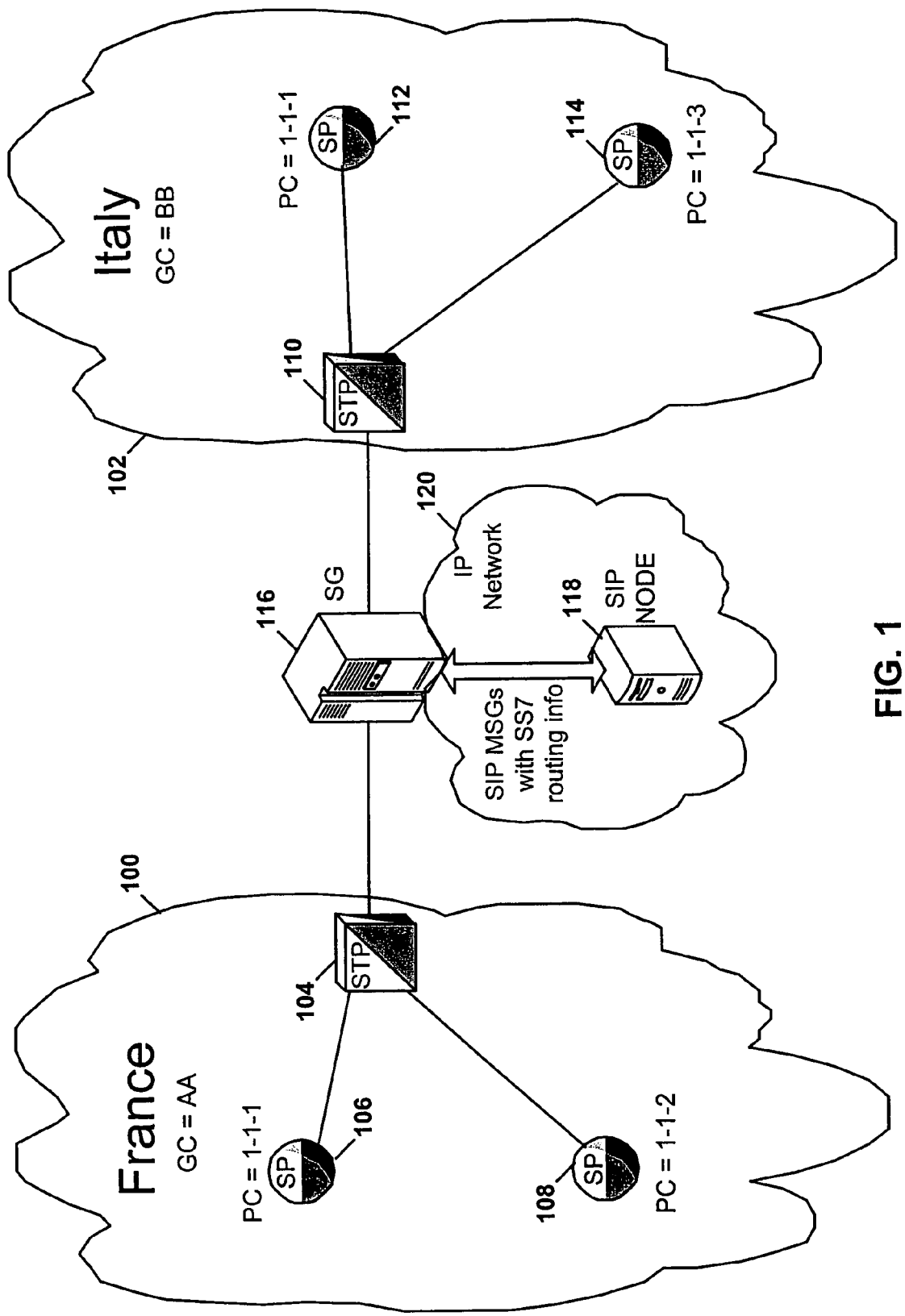
FIG. 1 is a network diagram illustrating an example of a network in which SS7 routing information and a parameter for triggering the SIP node to include the routing information in a response message may be included in a SIP message according to an aspect of the subject matter disclosed herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Thus, the subject matter described herein can be embodied in many different forms, and all such forms are contemplated to be within the scope of what is claimed.

In SS7, the message transfer part level 3 (MTP-3) protocol provides message routing and network management. The MTP-3 user adaptation layer (M3UA) is used for supporting the transfer of messages of any protocol layer that is identified to MTP-3 as an MTP-user protocol over IP networks. The list of protocol layers that may be transferred over IP networks using M3UA includes, ISDN User Part (ISUP) messages, signaling connection control part (SCCP) messages, and telephone user part (TUP) messages. In addition, transaction capabilities part (TCAP) and radio access network application part (RANAP) messages are transferred transparently by the M3UA protocol as SCCP payload, as they are SCCP-user protocols. The underlying transport protocol used for M3UA is typically the stream control transmission protocol (SCTP). M3UA is described in IETF Internet draft-sigtran-m3ua-12.txt, February 2002, the disclosure of which is incorporated herein by reference in its entirety.

The M3UA protocol includes a parameter referred to as network appearance. According to the protocol specification, network appearance is an M3UA local reference shared by a signaling gateway and an application server. The network appearance parameter, together with a signaling point code, uniquely identifies an SS7 node by indicating the specific SS7 network to which it belongs. The network appearance parameter can be used to distinguish signaling traffic associated with different networks being sent between the signaling gateway and an application server over a common SCTP association. An example scenario is where a signaling gateway appears as an element in multiple separate national SS7 networks that reuse the same SS7 signaling point code value. However, there is currently no mechanism provided in SIP for communicating the network appearance parameter to a destination node in the SIP network.

Another transport protocol that may be used to transport protocols that utilize MTP-3 is described in IETF RFC 3034: Tekelec's Transport Adapter Layer Interface, June 2000, the disclosure of which is incorporated herein by reference in its entirety. In the transport adaptation layer interface (TALI) protocol, the transport protocol implemented by OSI layers 3 and 4 is preferably transmission control protocol (TCP).

FIG. 1 is a network diagram illustrating an example of a network in which SS7 routing information may be included in a SIP message according to an aspect of the subject matter disclosed herein. FIG. 1 includes a French SS7 signaling network 100 and an Italian SS7 signaling network 102. French network 100 includes an STP 104 and signaling points 106 and 108. Similarly, Italian network 102 includes STP 110 and signaling points 112 and 114.

The French and Italian signaling points may be connected to their respective STPs via SS7 signaling links. As such, all signaling between these two national networks takes place via the two STPs. That is, a French signaling point cannot directly signal an Italian signaling point. Instead, a French signaling point must formulate a signaling message that is transmitted to French STP 104 and subsequently routed to Italian STP 110, which transmits the message to the intended Italian signaling point. It will be appreciated that the French and Italian STPs serve to effectively isolate their respective networks from each other. In addition, the same point codes may be used in each network. In FIG. 1, point code 1-1-1 is used by both signaling point 106 in French network 100 and signaling point 112 in Italian network 102. To differentiate between signaling points 106 and 112, each network may be assigned a network group code as discussed in commonly-assigned co-pending U.S. patent application Ser. No. 10/093,862, referred to above. In the example, French network 100 is assigned network group code AA and Italian network 102 is assigned network group code BB. The group code is used internally by STPs and signaling gateways to route messages to the appropriate national network. For example, in FIG. 1, if STP 104, SG 116, and STP 110 were combined into a single node, that node would be connected to multiple national networks. As a result, the node may receive messages that are addressed to a re-used point code. Such a node would associate a group code with inbound signaling messages based on the linkset from which the signaling messages are received. The group code would then be used in the route table lookup to ensure that a message is sent to the appropriate national network.

A SIP signaling gateway 116 is connected to STPs 104 and 110. Signaling gateway 116 is adapted to communicate with SS7 nodes over SS7 networks or SS7 over IP networks and with a SIP node 118 over an IP network 120. Accordingly, signaling gateway 116 is adapted to use both SS7 and SIP protocols. For example, signaling gateway 116 may communicate with SIP node 118 using SIP according to the SPIRITS protocol framework. Signaling gateway 116 may also function as an STP in the SS7 network. SIP node 118 may be, for example, a SIP proxy server.

As discussed above, SIP lacks a mechanism for transferring SS7 routing information. Consequently, when an SS7 message is received at signaling gateway 116 from signaling point 108 that requests information from SIP node 118 using SIP, the routing information necessary to return the requested information to signaling point 108 (or another designated SS7 signaling point) may not be included in the SIP message exchange. As a result, signaling gateway 116 would conventionally be required to store this information and match it to the corresponding message returned by SIP node 118. Maintaining such state information in signaling gateway 116 unnecessarily ties up resources that can be used for other tasks, thus reducing performance of the signaling gateway.

It is instead more efficient to include SS7 routing information in the SIP message, which can be returned with the corresponding SIP response from SIP node 118. As used herein, SS7 routing information includes SS7 point codes, SS7 network group codes, M3UA network appearance information (discussed further below), and other known SS7 routing information. If signaling point 108 needs to communicate with SIP node 118, for example to retrieve information or to establish a subscription, point code 1-1-2 may be included in the SS7 message that eventually reaches signaling gateway 116. Signaling gateway 116 includes SS7 routing information (point code 1-1-2) in the SIP message sent to SIP node 118. SIP node 118 returns a SIP response message that includes the SS7 routing information, in this case point code 1-1-2. It should be understood that the SS7 routing information does not necessarily have to identify the originating SS7 node, but may instead identify a separate SS7 destination node.

According to another aspect, the SS7 routing information included in the SIP message may include a network group code in addition to the point code. For example, for communications involving signaling points 106 or 112, a point code does not provide enough information to identify either signaling point uniquely. Network group code information may be used in addition to the point code to provide a unique identity for the signaling point. In such a case, the network group code information is also maintained in the corresponding SIP communications between signaling gateway 116 and SIP node 118. It should also be understood that network group code information may be included in the SIP communications without point codes, where an alternate means of identifying a specific signaling point in a particular network are used.

Figure 2:
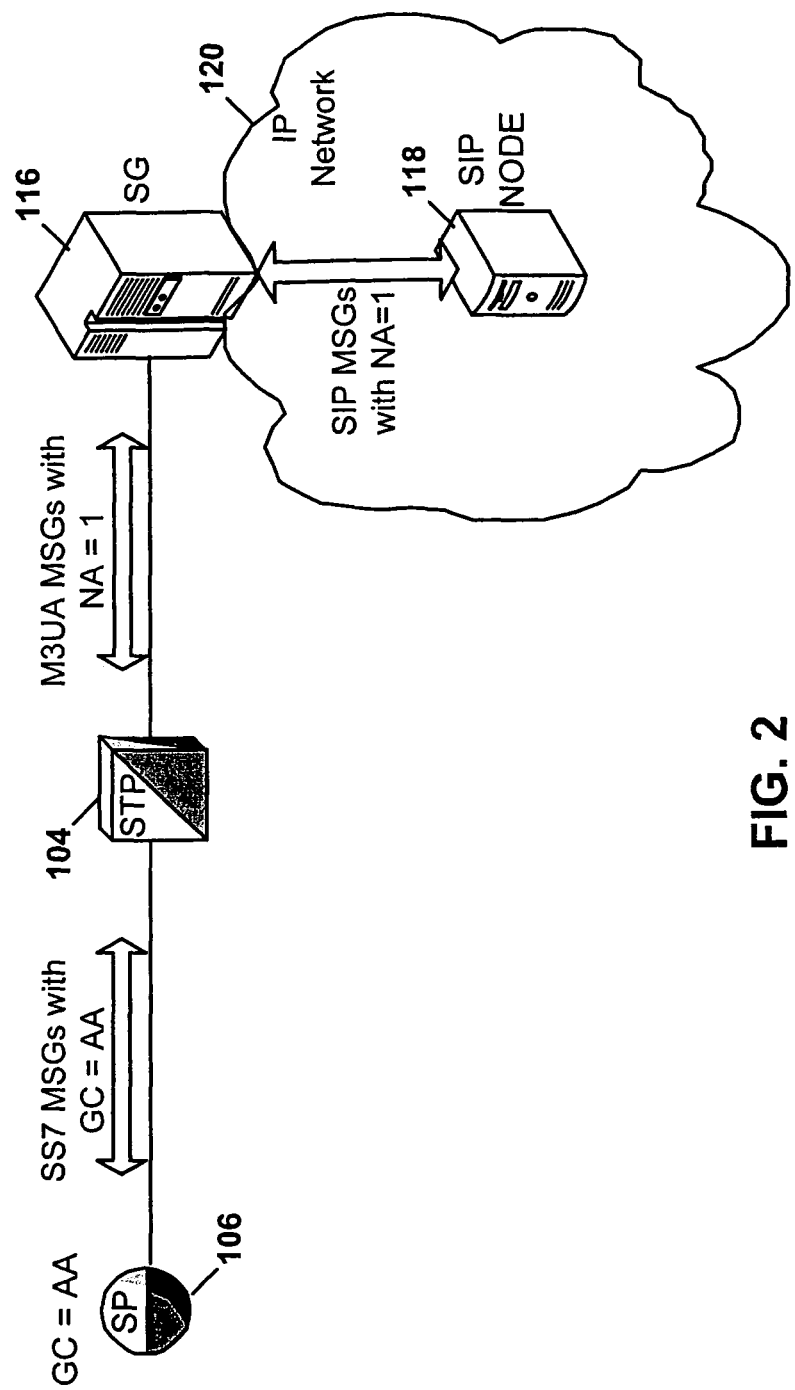
FIG. 2 is a network diagram illustrating an example of a network in which SS7 routing information and a parameter for triggering the SIP node to include the routing information in a response message may be included in a SIP message according to another aspect of the subject matter disclosed herein.

FIG. 2 is a network diagram illustrating an example of a network in which SS7 routing information may be included in a SIP message according to another aspect of the subject matter disclosed herein. In FIG. 2, signaling point 106 sends and receives SS7 messages to/from STP 104. STP 104 sends and receives corresponding M3UA messages to/from signaling gateway 116. The network group code information may be determined at STP 104 as described in commonly-assigned co-pending U.S. patent application Ser. No. 10/093,862, referred to above. The network group code information is translated to M3UA network appearance information at STP 104 and carried in the M3UA messages sent to signaling gateway 116. As stated above, M3UA network appearance is a parameter used in M3UA to indicate a specific SS7 network. Accordingly, the network appearance parameter may be employed to correspond to the SS7 network group code in M3UA messages. That is, an SS7 message may be translated to M3UA in STP 104 as shown in FIG. 2. Alternatively, the translation from SS7 to M3UA may be performed in signaling gateway 116 or in another node.

In any case, the network group code may be translated to a network appearance parameter, which is typically expressed as an integer. In the instant example, group code AA representing the French network may be translated to a network appearance parameter NA=1 in M3UA. The network appearance information is carried in SIP messages between signaling gateway 116 and SIP node 118. It should be understood that the translation to M3UA is not required according to the subject matter disclosed herein, but is instead one possible implementation. In addition, it should be understood that signaling gateway 116 may also perform the functions of STP 104 in FIG. 2, including but not limited to translating from SS7 to M3UA.

Figure 3:
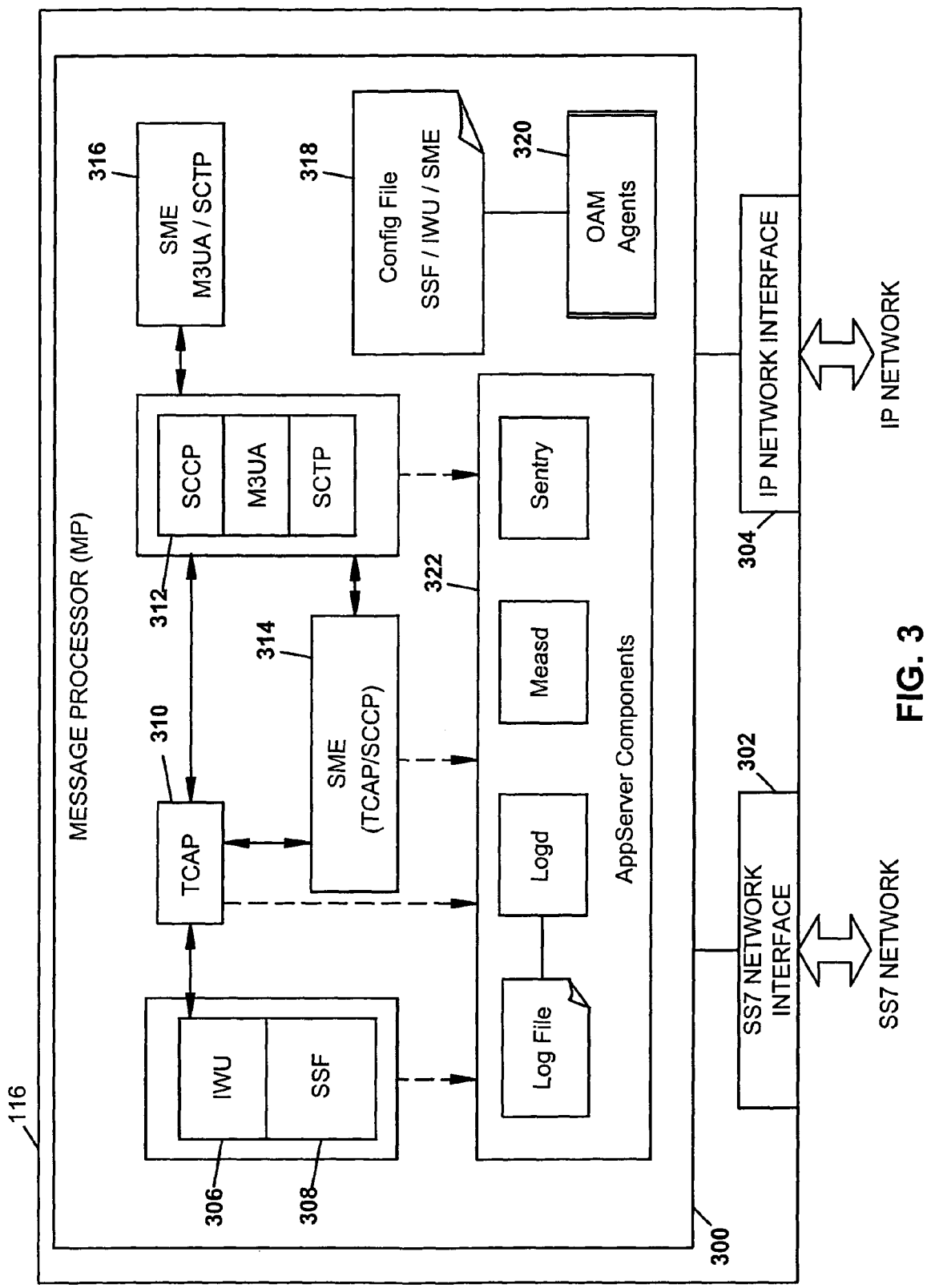
FIG. 3 is a block diagram illustrating an exemplary internal architecture of a signaling gateway according to an aspect of the subject matter described herein.

FIG. 3 is a block diagram illustrating an exemplary internal architecture of SG 116 according to an aspect of the subject matter described herein. An SS7/SIP gateway is also described in commonly-assigned co-pending U.S. patent application Ser. No. 11/085,620, filed Mar. 21, 2005, entitled "Methods, Systems, and Computer Program Products for Providing Telecommunications Services between a Session Initiation Protocol (SIP) Network and a Signaling System 7 (SS7) Network." In FIG. 3, SG 116 includes at least one message processor (MP) 300, an SS7 network interface 302, and then IP network interface 304. MP 300 includes SIP server framework (SSF) 306 and interworking unit (IWU) 308 that handle SIP messages to and from the IP network, identify telecommunications services required for a SIP message, identify the type of service, and for messages for which a telecommunications service is required, forward the required information to and request query formulation from TCAP component 310. IWU 306 also generates SIP messages to be sent to SIP node 118 via SS7 network interface 302. For example, IWU 306 may generate an INVITE or OPTIONS message and forward the message to a SIP proxy server in the IP network 120 and may receive and process SUBSCRIBE messages.

TCAP component 310 formulates corresponding TCAP queries and forwards the TCAP queries to SS7 over IP protocol stack 312. SS7-over-IP protocol stack 312 forwards TCAP queries to the SS7 network via SS7 network interface 302. For TCAP queries, protocol stack 312 may utilize SCCP, M3UA, SCTP, and IP layers. Although not illustrated in FIG. 3, message processor 300 may also include a standard SS7 protocol stack for sending and receiving SS7 messages over TDM-based SS7 links via SS7 network interface 302. In such an implementation, the M3UA and SCTP layers in protocol stack 312 would be replaced by MTP levels 1 through 3.

SME (TCAP/SCCP) 314 configures the TCAP and SCCP stack components. SME (M3UA/SCTP) 316 configures SS7-over-IP stack 312. SMEs 314 and 316 read configuration files 318 to configure protocol stack 312. Operations, administration, and maintenance (OAM) agents 320 create the configuration files for the software components of message processor 300. In particular, OAM agents 320 receive triggers from a provisioning server (not shown) and extract configuration information from database server 320. OAM agents 320 create configuration files 318 and start the SSF/IWU, TCAP, SCCP/M3UA/SCTP, and SME processes.

Application server components 322 log events generated by message processor 300. For example, application server components 322 may generate a log file that stores the alarm events. These functions may be performed by a logger daemon (logd). Application server components 322 may also include a measurements daemon (measd) that generates counts based on messages processed or generated by message processor 300. The sentry component of application server components 322 starts, stops, and restarts application server applications when it is determined that a particular application has failed.

SG 116 may be used for including SS7 routing information in a SIP message. SS7 network interface 302 receives a message having SS7 routing information from a remote SS7 node, such as SP 108. Message processor 300 generates a corresponding SIP message that includes the SS7 routing information. For example, IWU 306 may generate a corresponding SIP message based on a TCAP message received in conjunction with TCAP component 310 and other associated components described above. IP network interface is then used to forward the corresponding SIP message to SIP node 118, which may be a SIP proxy server.

Once again, the message processor may be adapted to include, in a SIP message, an SS7 point code, a network group code, network appearance information other SS7 routing information and a parameter instructing the receiving SIP node to include the SS7 routing information in a SIP response message.

IP network interface 304 may then receive a SIP message responding to the corresponding SIP message. The SIP response message includes the SS7 routing information. Message processor generates a SS7 message that includes the SS7 routing information. The SS7 message is forwarded, via SS7 network interface 302, to the destination based on the SS7 routing information.

According to one aspect, message processor 300 generates a SIP message that includes a SIP event instructing the remote SIP node to return the SS7 routing information in a subsequent message responding to the corresponding SIP message. For example, the SPIRITS protocol, described above, may be used. According to one implementation, the SPIRITS protocol is extended to include a new event type for carrying SS7 routing information. For example, a new event, referred to herein as "echo data", may be added to the SPIRITS protocol for carrying SS7 routing information in a SIP message. SIP node 118 echoes back the echo data event in a response messages to provide transaction level correlation at SG 116. Since SIP node 118 echoes back the echo data, SG 116 is able to correctly populate the corresponding SS7 message with the SS7 routing information.

The SPIRITS protocol defines a multipurpose Internet mail extension (MIME) type called "application/spirits-event+xml". This MIME type is present in the "Content-Type" header in SPIRITS formatted requests and responses, and describes an XML document that contains SPIRITS-related information. The echo data event is added to SPIRITS to carry SS7 routing information, but can also be used to carry any information that needs to be preserved through network nodes. The presence of the echo data event in a SIP message is an indication to SIP node 118 that it should be included in SIP response messages. Thus, by including in a SIP message an echo data event parameter with SS7 routing information, SSG 116 triggers SIP node 118 to include the routing information in SIP response messages so that SG 116 can send the corresponding SS7 response message to the correct node and/or national network. The echo data event need not be included in simple SIP acknowledgement messages, such as 200 OK messages. Both SG 116 and SIP node 118 are provisioned with echo data event type functionality.

SIP messages exchanged between SG 116 and SIP node 118 include an echo data field along with other necessary information to realize a particular service. Upon receiving the echo data field in SIP messages, SIP node 118 responds with an appropriate SIP message that will return the echo data.

Figure 4:
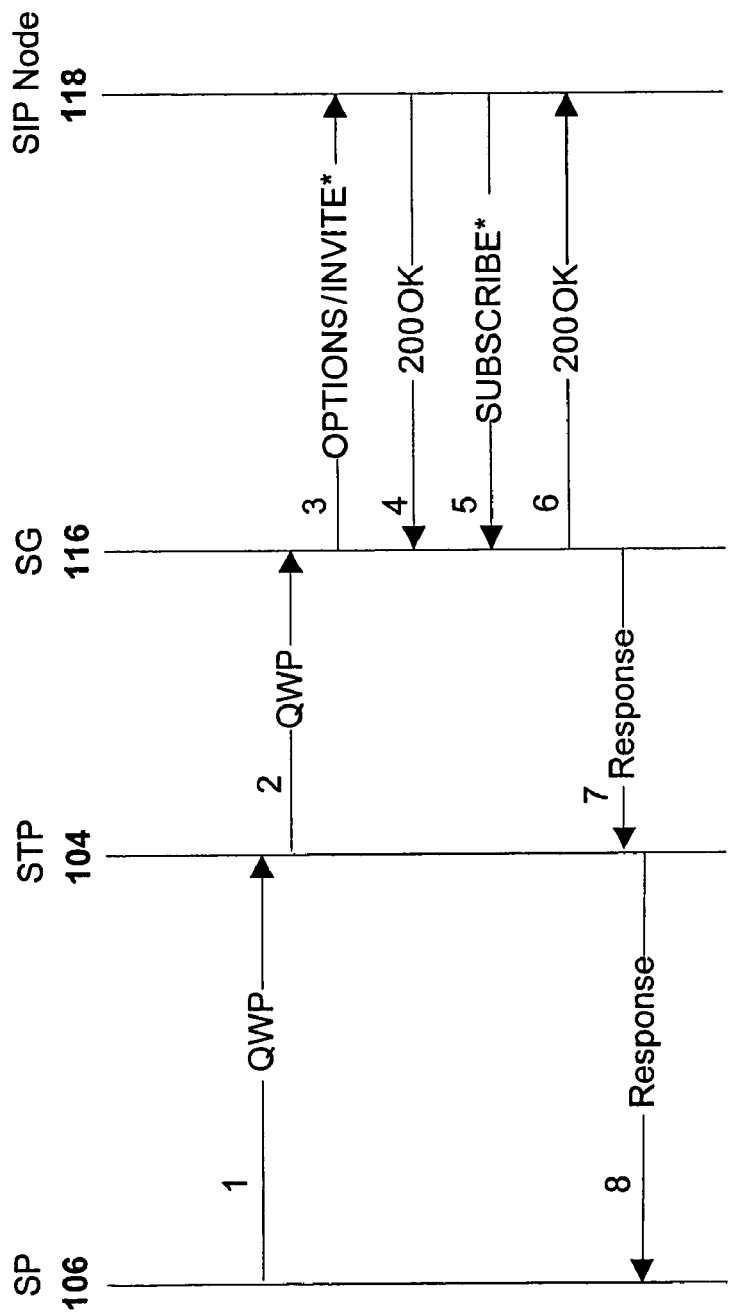
FIG. 4 is a signaling diagram illustrating an exemplary message flow according to an aspect of the subject matter disclosed herein.

FIG. 4 is a signaling diagram illustrating an exemplary message flow according to an aspect of the subject matter disclosed herein. In FIG. 4, signaling point 106 sends a TCAP message, in this case a query with permission (QWP), which includes network group code AA to STP 104 in line 1. In line 2, STP 104 forwards a corresponding M3UA message with network appearance NA=1 to SG 116. Lines 3-6 are SIP messages according to the SPIRITS protocol with an extension for echo data according to an aspect of the subject matter disclosed herein. Line 3 is an OPTIONS message sent by SG 116 to SIP node 118 with content type "application/spirits-event+xml", but may alternatively be an INVITE message. Line 4 is a 200 OK (acknowledgement) message indicating that the OPTIONS message has been received. Line 5 is a SUBSCRIBE message sent by SIP node 118 as a response to the OPTIONS message. Line 6 is a 200 OK message indicating that the SUBSCRIBE message has been received.

The corresponding SIP messages for lines 3-6 are shown below and are indicated by corresponding reference numerals. Note that each of lines 3 and 6 include SS7 network routing information in the respective SIP message (as indicated by asterisks), but not the 200 OK messages of line 4 and 5. In the below example, network appearance information, calling party point code, and called party point code routing information is shown as the SS7 routing information. In the example messages below, text related to the new echo data extension is shown in bold.

Line 3: SG sends OPTIONS message to SIP element
OPTIONS sip: 192.168.55.13 SIP/2.0
Via: SIP/2.0/UDP 172.16.72.151
From: d17-027 <sip: d17-027@192.168.55.206>
To: sip:user@192.168.55.13
Call-ID: 0118812117-000001
Accept: application/spirits-event+xml
CSeq: 1 OPTIONS
Content-type: application/spirits-event+xml -continued Content-length: 400
<?xml version="1.0" encoding="UTF-8"?>
 <spirits-event xmlns="urn:ietf:params:xml:ns:spirits-1.0">
  <Event type="INDPs" name="TAT">
   <Screening>01</Screening>
   <Presentaion>01</Presentation>
  </Event>
  <Event Name = "Echo Data">
   <Network Appearance>1</NetworkAppearance>
   <CallingPartyPointCode>1-1-1</CallingPartyPointCode>
   <CalledPartyPointCode>1-1-2</CalledPartyPointCode>
  </Event Name>
 </spirits-event>
Line 4: SIP elements send 200 OK to OPTIONS
SIP/2.0 200 OK
Via: SIP/2.0/UDP 172.16.72.151
From: d17-027 <sip: d17-027@192.168.55.206>
To: sip: user@192.168.55.13
Call-ID: 0118812117-000001
Accept: application/spirits-event+xml
CSeq: 1 OPTIONS
Line 5: SIP elements send SUBSCRIBE message to SG
SUBSCRIBE sip:+1-202-404-5555@192.168.55.13:5060 SIP/2.0
Via: SIP/2.0/UDP 192.168.55.206:5061;branch=z9hG4bK12345
Max-Forwards: 70
Record-Route:<sip:+1-202-404-5555@192.168.55.206;maddr= 192.168.55.206>
To: +1-202-404-5555 <sip:+1-202-404-5555@192.168.55.13>
From: +1-202-303-4444 <sip:+1-202-303-4444@192.168.55.206>;tag= 4455667
Call-ID: 0118812117-000001
Cseq: 2 SUBSCRIBE
Event: spirits-INDPs
Allow-Events: spirits-INDPs
Accept: application/spirits-event+xml
Contact: <sip:+1-202-303-4444@192.168.55.206>
Content-Type: application/spirits-event+xml
Content-Length: 264
<?xml version="1.0" encoding="UTF-8"?>
 <spirits-event xmlns="urn:ietf:params:xml:ns:spirits-1.0">
  <Event type="INDPs" name="TA" mode="N">
   <CalledPartyNumber>6302240216</CalledPartyNumber>
  </Event>
  <Event type="INDPs" name="TNA" mode="R">
   <CalledPartyNumber>6302240216</CalledPartyNumber>
  </Event>
  <Event type="INDPs" name="TB" mode="R">
   <CalledPartyNumber>6302240216</CalledPartyNumber>
  </Event>
  <Event Name = "Echo Data">
   <NetworkAppearance>1</NetworkAppearance>
   <CallingPartyPointCode>1-1-1</CallingPartyPointCode>
   <CalledPartyPointCode >1-1-2</CalledPartyPointCode>
  </Event Name>
 </spirits-event>
Line 6: SG sends 200 OK to subscribe message
SIP/2.0 200 OK
Via: SIP/2.0/UDP 192.168.55.206:5061;branch=z9hG4bK12345
Max-Forwards: 70
Record-Route: <sip:+1-202-404-5555@192.168.55.206; maddr= 192.168.55.206>
To: +1-202-404-5555 <sip:+1-202-404-5555@192.168.55.13>
From: +1-202-303-4444 <sip:+1-202-303-4444@192.168.55.206>;tag= 4455667
Call-ID: 0118812117-000001
Cseq: 2 SUBSCRIBE
Contact: <sip:+1-202-404-5555@192.168.55.13:5060>

In line 7, SG 116 sends a corresponding response message to STP 104, which is forwarded to signaling point 106 in line 8.

The SPIRITS protocol is based on an extensible markup language (XML) schema. The SPIRITS protocol includes procedural rules and the semantic context that is applied to these rules for processing SIP transactions. The SPIRITS protocol carries subscriptions for events from a SPIRITS server to a SPIRITS client and notifications of these events from the SPIRITS client to the SPIRITS server, such as SG 116 and SIP node 118. Since the server and client roles are somewhat interchangeable depending on the context, the terms "SPIRITS subscriber" and "SPIRITS notifier" may be used instead to indicate which node is subscribing and which node is notifying.

In general, a SPIRITS notifier is a user agent (UA) in the PSTN that accepts subscriptions from SPIRITS subscribers. These subscriptions contain events that the SPIRITS subscribers are interested in receiving a notification for, such as mobility. The set of events that can be subscribed to and the amount of notification that is returned vary among different PSTN operators. Some PSTN operators may have a rich set of events that can be subscribed to, while others have only the primitive set of events outlined in the SPIRITS protocol requirements document. The echo data event described above is not one of the events outlined in the SPIRITS protocol requirements document.

Using a SUBSCRIBE message, a SPIRITS subscriber subscribes to certain events using an XML document. A SPIRITS notifier notifies the SPIRITS subscriber of the occurrence of the event using a NOTIFY message. The <spirits-event> element is the root of a SPIRITS XML document, which is characterized by a Content-Type header of "application/spirits-event+xml">. This element contains a namespace declaration ('xmlns') to indicate the namespace on which the XML document is based. XML documents compliant to the SPIRITS protocol contain the URN "urn:ietf:params:xml:ns:spirits-1.0" in the namespace declaration. Other namespaces may be specified. The <spirits-event> element contains at least one <Event> element, and may contain more than one. The <Event> element contains three attributes, a 'type' attribute whose value is either "INDPs" or "userprof" (which correspond, respectively, to call-related events and non-call related events), a 'name' attribute that includes values limited to SPIRITS mnemonics defined in the SPIRITS protocol, and an optional 'mode' attribute whose value is either "N" or "R", corresponding respectively to (N)otification or (R)equest. Again, additional information about the SPIRITS protocol may be obtained in IETF Network Working Group RFC 3910, October 2004, which is incorporated by reference herein in its entirety.

Figure 5:
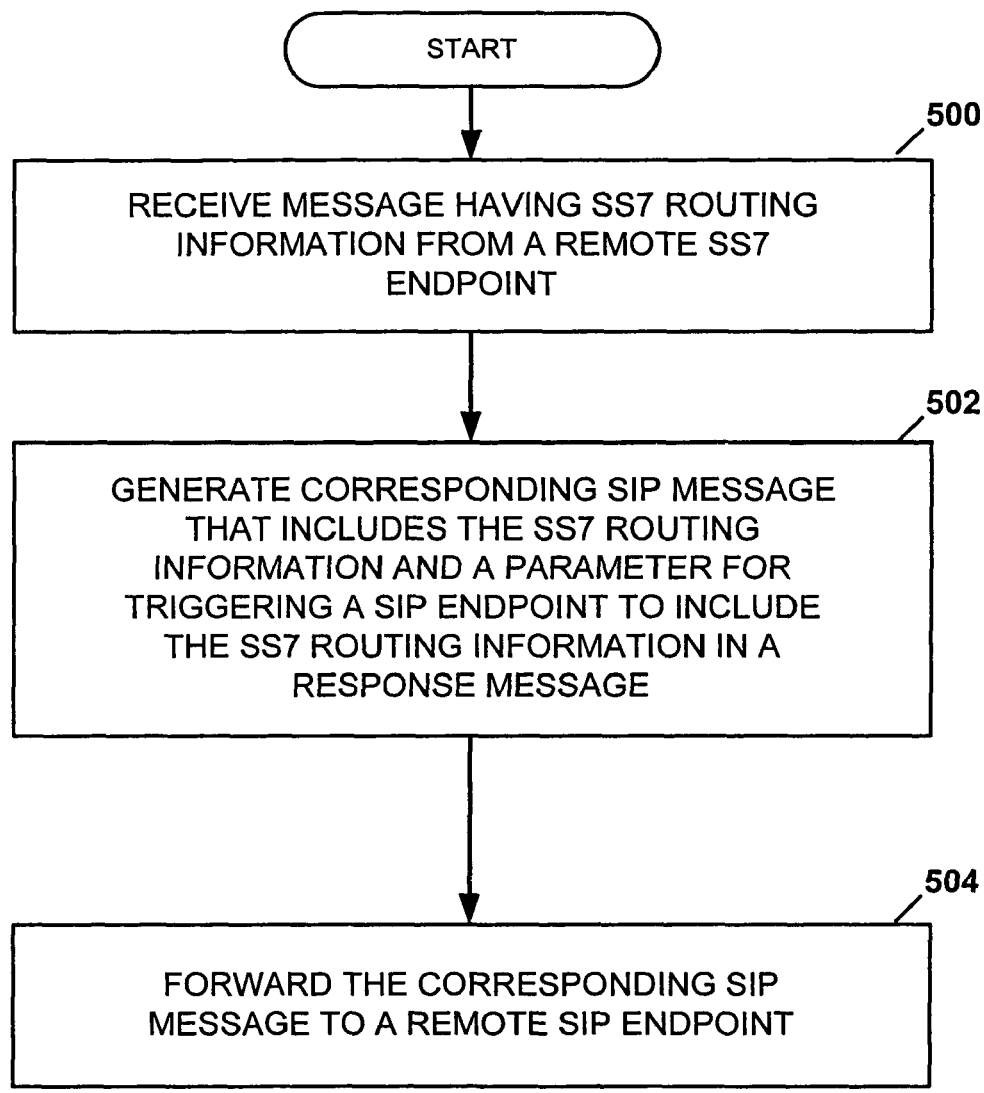
FIG. 5 is a flow diagram illustrating a method for including, in a SIP message, SS7 routing information and a parameter for triggering the SIP node to include the routing information in a response message according to an aspect of the subject matter disclosed herein.

FIG. 5 is a flow diagram illustrating a method for triggering SIP nodes to include SS7 routing information in response messages including information requested by SS7 nodes according to an aspect of the subject matter disclosed herein. In step 500, a message having SS7 routing information is received from a remote SS7 node at SG 116. In step 502, SG 116 generates a corresponding SIP message that includes the SS7 routing information and a parameter instructing the receiving SIP node to include the SS7 routing information in a SIP response message. The corresponding SIP message is forwarded to a remote SIP node in step 504.

Figure 6:
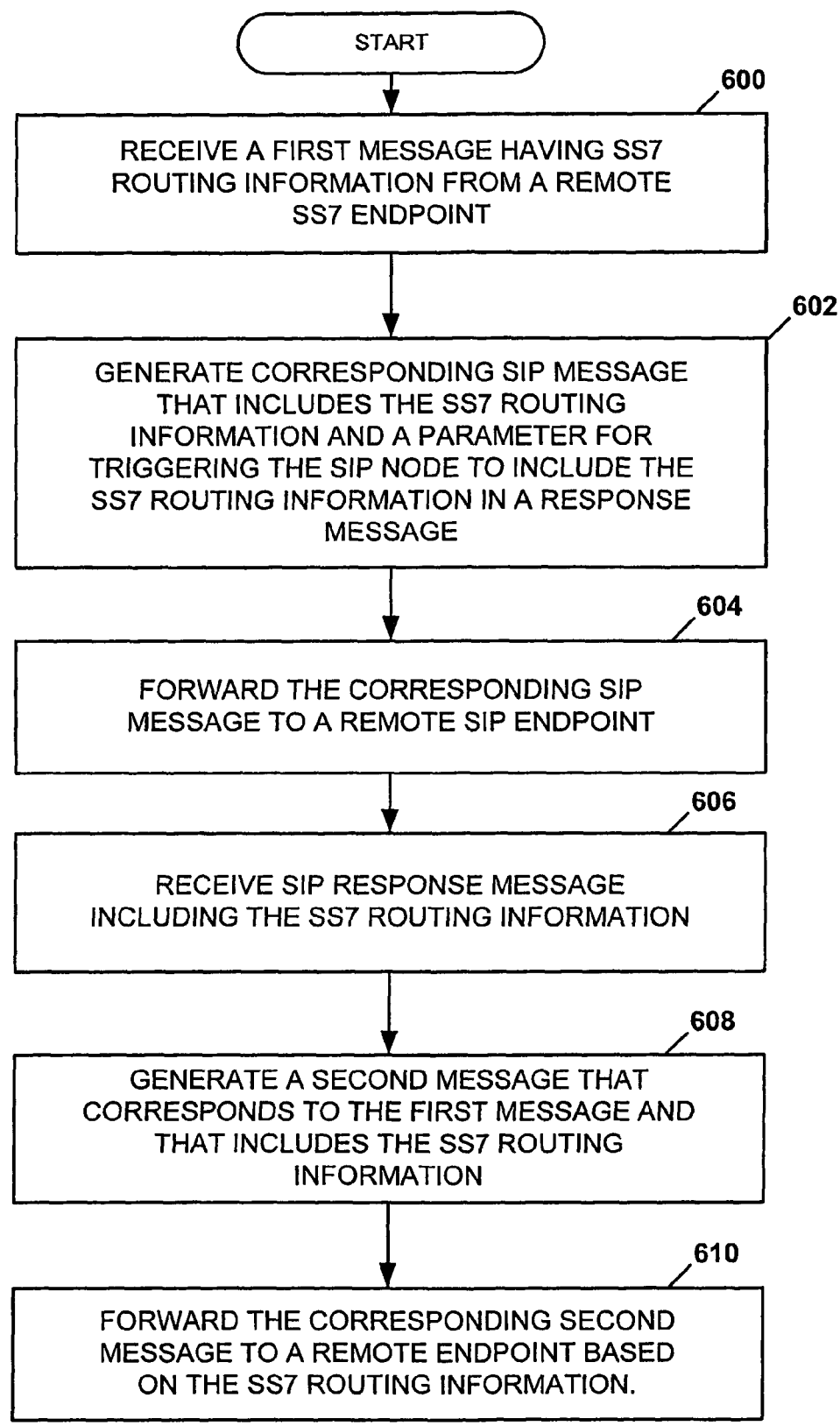
FIG. 6 is a flow diagram illustrating a method for including, in a SIP message, SS7 routing information and a parameter for triggering the SIP node to include the routing information in a response message according to another aspect of the subject matter disclosed herein.

FIG. 6 is a flow diagram illustrating a method for triggering SIP nodes to include SS7 routing information in response messages including information requested by SS7 nodes according to another aspect of the subject matter disclosed herein. In step 600, a first message having SS7 routing information is received from a remote SS7 node at SG 116. In step 602, SG 116 generates a corresponding SIP message that includes the SS7 routing information and a parameter instructing the receiving SIP node to include the SS7 routing information in a SIP response message. The corresponding SIP message is forwarded to a remote SIP node in step 604. The parameter triggers the SIP node to include the SS7 routing information in a response message. In step 606, a SIP response message including the SS7 routing information is received by SG 116. A second message that corresponds to the first message and that includes the SS7 routing information is generated at SG 116 in step 608. The corresponding second message is forwarded to a remote endpoint based on the SS7 routing information in step 610.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for triggering session initiation protocol (SIP) nodes to include signaling system number seven (SS7) routing information in response messages including information requested by SS7 nodes, the method comprising:
    (a) receiving, from an SS7 node, a first message having SS7 routing information, wherein the SS7 routing information includes message transfer part level 3 (MTP3) user adaptation layer (M3UA) network appearance information, network group code information, or an SS7 point code, wherein a network appearance parameter, together with a signaling point code, uniquely identifies an SS7 node;
    (b) generating a corresponding SIP message that includes the SS7 routing information and a parameter instructing a receiving SIP node to include the SS7 routing information in a SIP response message; and
    (c) forwarding the corresponding SIP message to a remote SIP node.

2. The method of claim 1 wherein receiving a first message includes receiving a message having an SS7 point code and generating a corresponding SIP message includes generating a corresponding SIP message having the SS7 point code.

3. The method of claim 1 wherein receiving a first message includes receiving a message having network group code information and generating a corresponding SIP message includes generating a corresponding SIP message having the network group code information.

4. The method of claim 1 wherein receiving a first message includes receiving a message transfer part level 3 (MTP3) user adaptation layer (M3UA) having network appearance information and generating a corresponding SIP message includes generating a corresponding SIP message having the network appearance information.

5. The method of claim 1 wherein generating a corresponding SIP message includes generating a SIP message according to the services in public switched telephone network requesting Internet services (SPIRITS) protocol.

6. The method of claim 1 wherein the parameter comprises an echo event instructing the remote SIP node to return the SS7 routing information in a subsequent message responding to the corresponding SIP message.

7. The method of claim 1 comprising:
    (a) receiving the response message, the response message comprising a SIP message including the SS7 routing information;
    (b) generating a second message, corresponding to the first message, that includes the SS7 routing information; and
    (c) forwarding the second message to a remote endpoint based on the SS7 routing information.

8. A tangible computer readable medium having stored thereon computer executable instructions that when executed by a processor of a computer perform steps comprising:
    (d) receiving, from a signaling system number seven (SS7) node, a first message having SS7 routing information, wherein the SS7 routing information includes message transfer part level 3 (MTP3) user adaptation layer (M3UA) network appearance information, network group code information, or an SS7 point code, wherein a network appearance parameter, together with a signaling point code, uniquely identifies an SS7 node;

(e) generating a corresponding session initiation protocol (SIP) message that includes the SS7 routing information and a parameter for triggering a SIP node to include the routing information in a response message; and (f) forwarding the corresponding SIP message to a remote SIP node.

9. The computer readable medium of claim 8 wherein receiving a first message includes receiving a message having an SS7 point code and generating a corresponding SIP message includes generating a corresponding SIP message having the SS7 point code.

10. The computer readable medium of claim 8 wherein receiving a first message includes receiving a message having network group code information and generating a corresponding SIP message includes generating a corresponding SIP message having the network group code information.

11. The computer readable medium of claim 8 wherein receiving a first message includes receiving a message transfer part level 3 (MTP3) user adaptation layer (M3UA) having network appearance information and generating a corresponding SIP message includes generating a corresponding SIP message having the network appearance information.

12. The computer readable medium of claim 8 wherein generating a corresponding SIP message includes generating a SIP message according to the services in public switched telephone network requesting Internet services (SPIRITS) protocol.

13. The computer readable medium of claim 8 wherein the parameter comprises an echo event instructing the remote SIP node to return the SS7 routing information in a subsequent message responding to the corresponding SIP message.

14. The computer readable medium of claim 8 comprising:
(a) receiving the response message, the response message comprising a SIP message including the SS7 routing information;
(b) generating a second message, corresponding to the first message, that includes the SS7 routing information; and
(c) forwarding the second message to a remote endpoint based on the SS7 routing information.

15. A system for triggering session initiation protocol (SIP) nodes to include SS7 routing information in response messages including information requested by signaling system number seven (SS7) nodes, the system comprising:

(g) an SS7 network interface for receiving, from an SS7 node, a first message having SS7 routing information, wherein the SS7 routing information includes message transfer part level 3 (MTP3) user adaptation layer (M3UA) network appearance information, network group code information, or an SS7 point code, wherein a network appearance parameter, together with a signaling point code, uniquely identifies an SS7 node;

(h) a message processor for generating a corresponding SIP message that includes the SS7 routing information and a parameter for triggering a SIP node to include the routing information in a response message; and (i) an IP network interface for forwarding the corresponding SIP message to a remote SIP node.

16. The system of claim 15 wherein the message processor is adapted to include an SS7 point code in the SIP message.

17. The system of claim 15 wherein the message processor is adapted to include network group code in the SIP message.

18. The system of claim 15 wherein the message processor is adapted to include network appearance information in the SIP message.

19. The system of claim 15 wherein the SIP message comprises SPIRITS protocol message.

20. The system of claim 15 wherein the parameter comprises an echo event instructing the remote SIP node to return the SS7 routing information in message.

21. The system of claim 15 wherein:
(a) the IP network interface is adapted to receive the response message, the response message comprising a SIP response message including the SS7 routing information;
(b) the message processor is adapted to generate a second message, corresponding to the first message, that includes the SS7 routing information; and
(c) the SS7 network interface is adapted to forward the second message to a remote endpoint based on the SS7 routing information.

* * * * *